Figure 1:
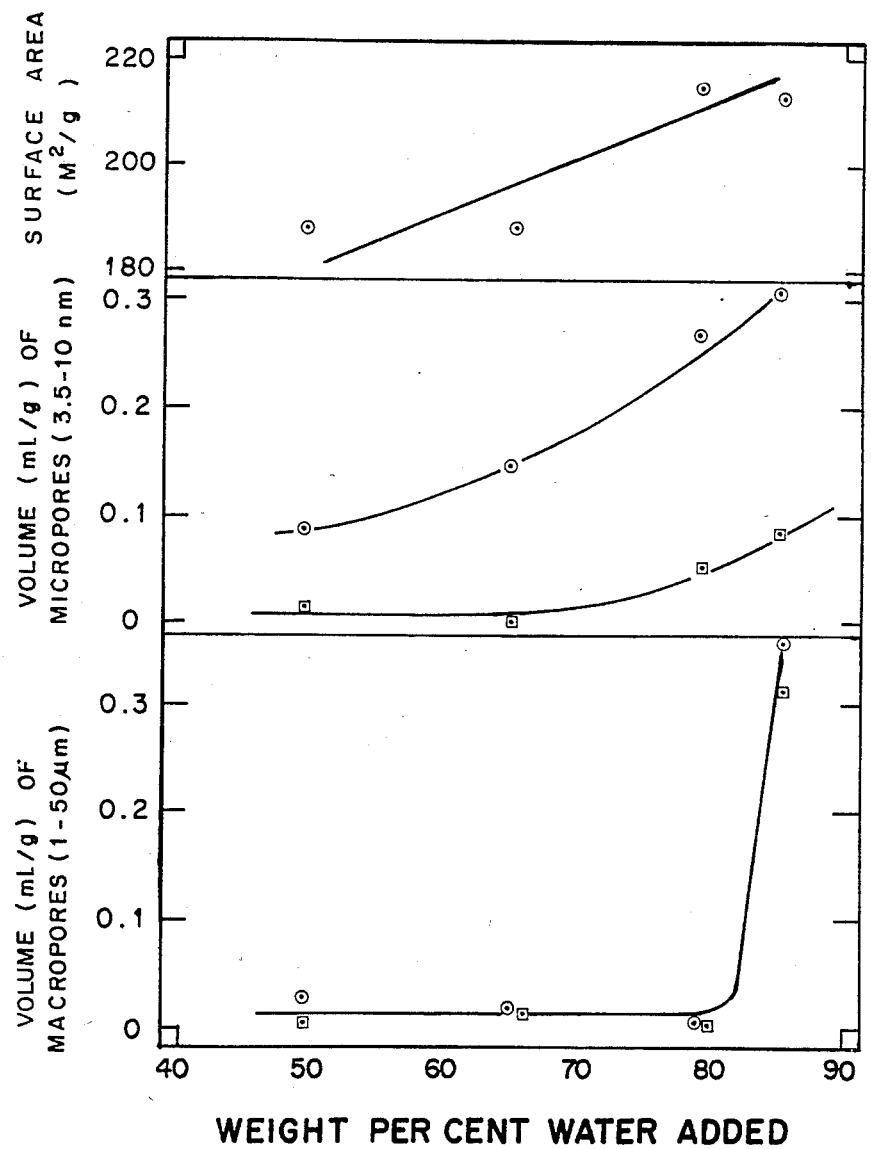

United States Patent [19]

Ternan et al.

[11] Patent Number: 4,558,031
[45] Date of Patent: Dec. 10, 1985

[54] HIGH POROSITY CATALYST

[75] Inventors: Marten Ternan, Hazeldean; Basil I. Parsons, Kars, both of Canada

[73] Assignee: Her Majesty the Queen in right of Canada, as represented by the Minister of Energy, Mines and Resources of Canada, Ottawa, Canada

[21] Appl. No.: 460,598

[22] Filed: Jan. 24, 1983

[51] Int. Cl.⁴ .......................... B01J 23/08; B01J 35/00
[52] U.S. Cl. ..................................... 502/355; 502/439
[58] Field of Search .......................... 252/463, 477 R; 502/355, 439

[56] References Cited

U.S. PATENT DOCUMENTS

| | | | |
|---|---|---|---|
| 3,264,228 | 8/1966 | Burbridge | 252/463 |
| 3,628,914 | 12/1971 | Graulier | 252/463 |
| 3,864,461 | 2/1975 | Miller et al. | 423/628 |
| 3,867,312 | 2/1975 | Stephens | 252/462 |
| 3,975,509 | 8/1976 | Royer et al. | 252/463 |
| 4,045,372 | 8/1977 | Warthen et al. | 252/463 |
| 4,077,908 | 3/1978 | Stenzel et al. | 252/455 R |
| 4,098,874 | 7/1978 | Mitsche et al. | 423/628 |
| 4,124,699 | 11/1978 | Michel et al. | 423/628 |
| 4,166,100 | 8/1979 | Vorobiev et al. | 423/626 |
| 4,260,524 | 4/1981 | Yamada et al. | 252/463 |
| 4,277,376 | 7/1981 | Paolasini | 252/463 |

*Primary Examiner*—William R. Dixon, Jr.
*Assistant Examiner*—Cynthia A. Prezlock
*Attorney, Agent, or Firm*—Finnegan, Henderson, Farabow, Garrett & Dunner

[57] ABSTRACT

A method is described for producing a catalyst or catalyst support having both high surface area, e.g. greater than 150 m²/g, and large pore sizes, e.g. greater than 1.0 ml/g of macropores having diameters between 1 and 50 μm. According to the method, a metal oxide is mixed with water and an acid to form a dilute metal gel, preferably containing at least 70% by weight water and consisting of a loose three dimensional network of oxide containing the water evenly dispersed throughout. This gel is slowly dried at a temperature below the boiling point of water whereby a substantial proportion of the water is removed from the interior of the pore structure, leaving the three dimensional network intact. Thereafter, the dried product is calcined to form a novel catalyst or catalyst support having both high surface area and large pore sizes. The novel catalyst is useful as a component of a catalytic cracking catalyst or a hydrocracking catalyst.

6 Claims, 2 Drawing Figures

HIGH POROSITY CATALYST

This invention relates to a novel catalyst or catalyst support having both high surface area and large pore sizes and a method for its production.

Many conventional catalysts consist of chemically active components plus a catalytic support. The support may or may not participate in the reactions being catalyzed. It is frequently desirable for catalysts to have a large surface area which is normally provided by the catalyst support. Generally the larger the surface area, the greater the reaction rate since the catalyst functions by having species react on catalytic centers located on the surface. Usually high surface area catalysts are very porous materials. The chemical reactants usually diffuse through the pores of the catalyst and eventually become chemisorbed on its surface. The reactions are thought to occur on the sites where chemisorption takes place. The total reaction rate will increase as the surface area per unit weight of catalyst increases.

Variations in manufacturing procedures, such as high temperature treatment (sintering) may cause changes in the surface area of the support. As the surface area per unit weight of catalyst increases, there is often a simultaneous decrease in the size of the pores within the catalyst. In other words, as the surface area increases, the pore size decreases. If the pores become sufficiently small, diffusion limitations can result. In other words, the rate of reaction is limited by the rate at which reactant molecules can diffuse from the bulk fluid surrounding a catalyst support through the catalyst pore structure to a vacant reactive site in its interior. Generally it is desirable to maximize the catalyst surface area in such a manner that the reaction rate is not limited by the rate of diffusion of either reactant or product molecules.

This effect tends to occur during the hydrocracking of high molecular weight species, such as those organic molecules present in oil sands bitumen or heavy oils. The molecules have large dimensions and, as a result, when standard hydrocracking catalysts having pore diameters of 7 nm are used, it is generally found that diffusion limitations become a problem. Another problem during hydrocracking is catalyst fouling. This results from organometallic compounds depositing their metals, carbonaceous species forming coke and other inorganic materials present in the feedstock which deposit on the catalyst. In particular, it has been noted that the metals tend to accumulate at the exterior surfaces of the catalyst pellets or catalyst extrudate shapes. When such catalysts are physically examined, it is found that there are large concentrations of metals at the outside surface of the catalyst shapes whereas the interior of the catalyst contains metals in only very low concentrations.

The prior art describes studies which were performed in order to manufacture large pore catalysts by sintering the catalysts at high temperatures. This is described, for example, in U.S. Pat. No. 4,124,699, issued Nov. 8, 1978. While this technique increases the pore sizes in the catalyst, it also decreases the catalyst surface area. It has been found that there is a general relationship such that as one property increases, the other decreases. Several phenomena have been observed when large pore catalysts prepared by high temperature sintering have been used for hydrocracking reactions. Thus, it has been shown that as the pore size increases, the reaction rate per unit surface area also increases. This is an indication of declining diffusion limitations. Furthermore, as the pore size increases, the metals profile in the catalyst shape also improves in that there are lower concentrations of metals at the exterior surface of the catalyst shape. In contrast, the metals concentration within the interior of the catalyst increases. This is a desirable effect in that a greater quantity of metals can be loaded into the catalyst shape before it becomes fully deactivated. In this way, the catalyst life with respect to metals fouling can be extended.

Finally, it has been found that the large pore catalysts of the prior art produced by sintering caused decreased conversions. Although the reaction rate per unit surface area increased, the surface area per unit catalyst weight decreased to a greater extent. The result was that the overall extent of reaction decreased as the catalyst pore size increased. In summary, it was apparent that increasing the catalyst pore size by high temperature sintering was not a beneficial procedure.

Accordingly, there has remained a need to develop a large pore catalyst having greater surface areas.

According to the present invention there has been developed a catalyst or catalyst support having both high surface area and large pore sizes. It is produced by a method comprising mixing a metal oxide, preferably alumina, with water and an acid to form a dilute metal gel consisting of a loose three dimensional network of oxide containing a large amount of water evenly dispersed throughout. This gel is slowly dried at a temperature below the boiling point of water whereby a substantial proportion of the water is removed from the interior of the pore structure, leaving the three dimensional network intact. Thereafter, the dried product is calcined to form a catalyst or catalyst support having both high surface area and large pore sizes.

The catalyst support obtained according to the method of the present invention permits the reacting species to diffuse further towards the catalyst interior before reacting and fouling the catalyst by depositing its metals. In this way, the catalyst of the invention can be loaded more fully with metals before it becomes completely deactivated. The increase in catalyst pore size also tends to remove diffusion limitations so that the large molecular weight species also have access to the reaction sites in the catalyst interior.

One of the features of the present invention is the use of a low temperature, slow drying technique. During drying, the temperature of the aquagel is maintained below the boiling point of water. It is generally recognized in drying practice that when the temperature of the material exceeds the boiling point of the solvent, i.e. water, evaporation will occur within the aquagel at the point where the water is present. On the other hand, when the temperature of the aquagel is below the boiling point of water, the water will diffuse from its location in the gel to the exterior, where it subsequently evaporates. This mechanism is believed to eliminate the high surface tension forces at the liquid-vapor-solid contact line, thereby preventing the collapse of the pore structure.

The aquagel is formed from three dimensional networks of a metal oxide which branch and hold water in their interior. The extent of gel formation is a complicated function of acid addition and resulting pH level. The second important feature of the invention is the addition of an appropriate amount of acid to develop a gel consisting of a loose, three dimensional network of oxide containing a large amount of water which is evenly dispersed throughout. During the drying, it is desirable to remove the water from the interior of the pore structure and leave the three dimensional network intact.

In one embodiment, the water content of the gel before drying is normally at least 70% by weight and the gel preferably contains about 80 to 96% by weight water, with a low acid concentration. During the low temperature drying the water content is preferably decreased to below 20% by weight. Of course, it is desirable to have the water content as low as possible before calcining, e.g. less than 5% by weight.

Among the acids that can be used, there can be mentioned nitric acid, sulphuric acid, and hydrochloric acid. The nitric acid is particularly preferred because it will not contribute undesirable anions to the catalyst after the calcining period. During high temperature calcining, the nitrate ions from nitric acid are evolved as nitrogen-oxide gases. The acid content of the gel is preferably at least 2% by weight and an amount of about 5 to 40% by weight is particularly preferred.

It is also possible to produce gels having very high acid concentrations and lower water contents of at least 10% by weight.

The slow drying of the gel is normally conducted at a temperature in the range of about 30° to 100° C. with a temperature of 50° to 99° C. being particularly preferred. The calcining was conducted at a usual temperature range of about 300° to 1000° C. with a range of 400° to 650° C. being particularly preferred.

The resulting product has a very large surface area of greater than 150 m²/g and also a very large pore volume of greater than 0.2 ml/g of macropores having diameters between 1 and 50 μm. Preferably the volume of macropores is greater than 0.7 ml/g.

The catalyst support of this invention is well suited for forming one component of a catalytic cracking catalyst. It has particular value for processing heavier feedstocks because the larger molecules can enter the large pores and react. The product molecules from the large pores can react further in the smaller pore diameter components of conventional catalysts. Typical of the conventional catalytic cracking catalysts that can be combined with the catalyst of this invention is amorphous silica-alumina with zeolite.

It can also be used as a component of a hydrocracking catalyst, particularly for processing heavy feedstocks. The very large molecules can react in the large pores and the products from the large pores can then react further in the other components of a conventional hydrocracking catalyst, such as sulphided $CoO$-$MoO_3$-$Al_2O_3$.

Figure 2:
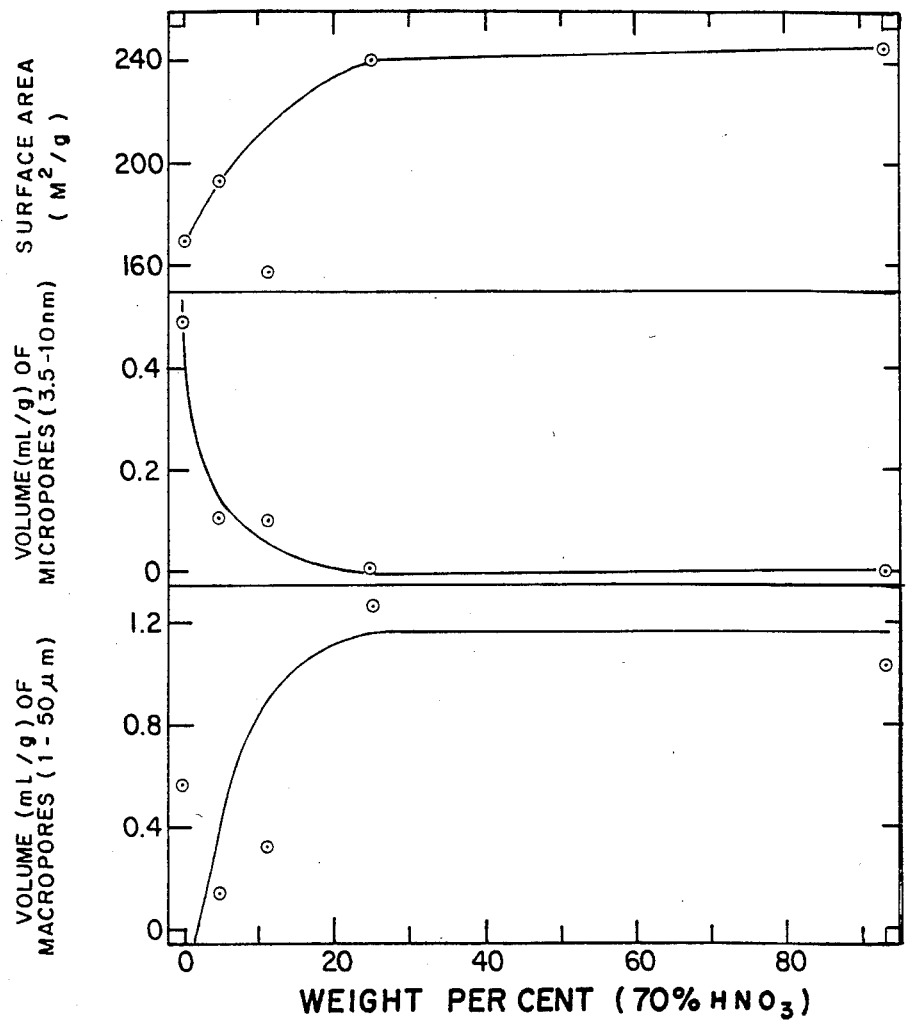

Certain preferred features of the present invention are illustrated by the following examples. In the drawings referred to in the examples, FIG. 1 is plots showing surface areas and pore volumes with different percentages of water and FIG. 2 shows surface areas and pore volumes with different amounts of acid.

EXAMPLE 1

A series of oxide catalyst supports were prepared using alumina monohydrate (Boehmite) as the metal oxide. This was combined with distilled water and a solution 70 wt % nitric acid and thoroughly mixed in the proportions set out in Table 1 below:

TABLE 1

Porous Catalysts Prepared With Various Amounts of Water

| Catalyst | Boehmite wt % | Water wt % | 70% HNO₃ wt % | Gel Condition |
|---|---|---|---|---|
| A | 9.4 | 85.2 | 5.4 | very watery |
| B | 15.6 | 79.1 | 5.3 | watery |
| C | 32.4 | 65.3 | 2.3 | firm |
| D | 49.8 | 49.6 | 0.7 | firm |

The above mixture was prepared using nitric acid up to a maximum of approximately 5 wt % in order to obtain a relatively stiff gel. In this series of experiments, the water to Boehmite ratio was changed in the different mixtures. Each mixture was dried at 60° C. for approximately 24 hours.

Mercury porosimetry measurements were made on the dried material in order to determine its pore size distribution. After drying, the material was further calcined at 500° C. for six hours and further mercury porosimetry measurements were made to determine the pore size distribution in the calcined material. The results are shown in FIG. 1. It will be seen from FIG. 1 that large surface areas were obtained for all the catalyst supports. The volume of micropores, i.e. those having diameters between 3.5 and 10 nm, increased on calcining. Also, there was no increase in micropore volume with increasing water to Boehmite ratio. The macropores (pore diameters between 1 and 50 m) had volumes similar before and after calcining. However, there was a large increase in macropore volume when the amount of water added was greater than 80 wt %. It was apparent that large volumes of macropores could be incorporated into the catalyst at high water to Boehmite ratios.

EXAMPLE 2

A second series of catalyst supports were prepared following the same procedures described in Example 1. The proportions of reactants are set out in Table 2 below:

TABLE 2

Porous Catalysts Prepared With Various Amounts of 70% HNO₃

| Catalyst | Boehmite wt % | Water wt % | 70% HNO₃ wt % | Gel Condition |
|---|---|---|---|---|
| E | 9.1 | 90.9 | — | no gel formed |
| F | 8.7 | 86.7 | 4.6 | firm gel |
| G | 8.1 | 80.5 | 11.4 | watery gel |
| H | 6.5 | 64.9 | 28.6 | clear solution plus firm gel |
| J | 6.6 | — | 93.4 | crusty solid |

As in Example 1 the resulting mixture was dried and calcined and the final results obtained are shown in FIG. 2. All of the resulting catalyst supports had large surface areas. As the amount of acid added to the mixture increased, the macropore volume decreased and was eventually eliminated. The macropore volume increased upon acid addition. Maximum macropore volume was obtained by using more than 20 wt % concentrated (70%) nitric acid.

The results in FIG. 2 show that catalyst supports having both large surface areas and a large volume of large diameter pores can be prepared. The large pores admit reactant molecules having high molecular weights. The high surface areas present a large number of reaction sites.

We claim:

1. A method of producing catalysts or catalyst supports having both high surface area and large pore sizes which comprises mixing an alumina with water and nitric acid to form an alumina gel consisting of a loose three dimensional network, the acid being present in an amount of at least 250 parts of 70% $HNO_3$ per 100 parts of alumina, slowly drying the gel at a temperature below the boiling point of water whereby water is removed from the interior of the pore structure to a water content of less than 20% by weight leaving the three dimensional network intact, and thereafter calcining the dried product to form a catalyst or catalyst support having a surface area greater than 200 $m^2/g$ and a volume of greater than 0.7 ml/g of macropores having diameters between 1 and 50 $\mu$m.

2. The method of claim 1 wherein the gel is dried to a water content of less than 5% by weight prior to calcining.

3. A catalyst or catalyst support produced according to the process of claim 1.

4. The method of claim 1 wherein the alumina gel contains at least 10% by weight of water prior to drying.

5. The method of claim 1 wherein the gel is dried at a temperature in the range of 30° to 100° C.

6. The method of claim 5 wherein the calcining is conducted at a temperature of 300° to 1000° C.

* * * * *